R. SARAZIN.
METHOD OF ELECTRIC WELDING.
APPLICATION FILED JAN. 2, 1919.
1,302,440.
Patented Apr. 29, 1919.
2 SHEETS—SHEET 1.
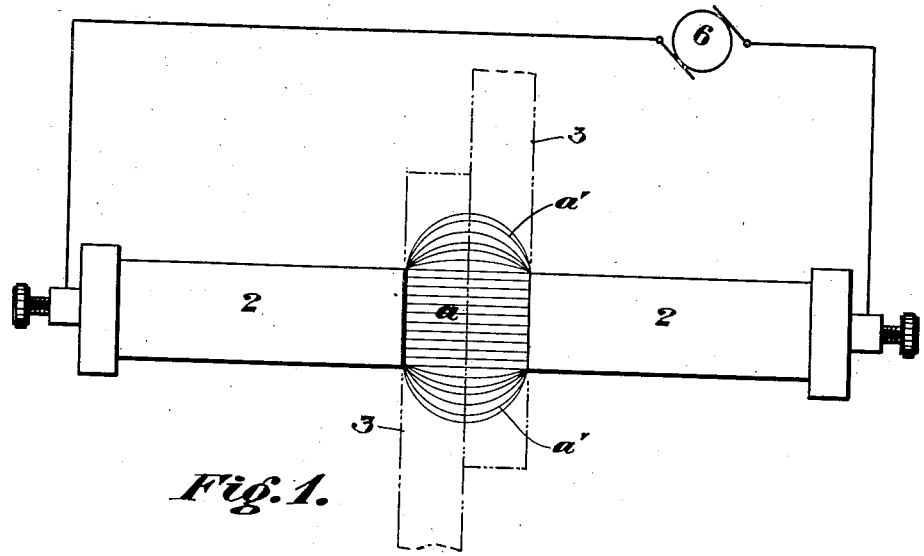
Fig. 1.
Fig. 2.
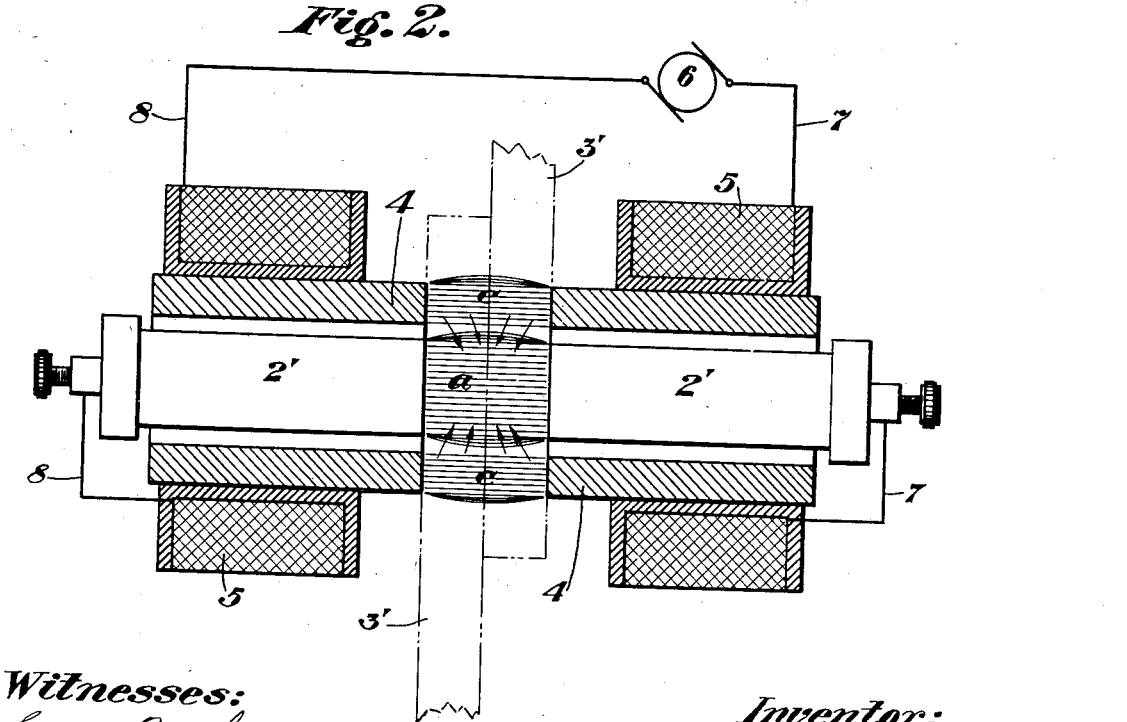
Witnesses:
Edwin Trueb
Lois Wineman.
Inventor:
Robert Sarazin
by C. M. Clarke
Atty.

R. SARAZIN.
METHOD OF ELECTRIC WELDING.
APPLICATION FILED JAN. 2, 1919.

1,302,440.

Patented Apr. 29, 1919.
2 SHEETS—SHEET 2.

Witnesses:
Edwin Trueb
Lois Wineman

Inventor:
Robert Sarazin
by C. M. Clarke
atty.

UNITED STATES PATENT OFFICE.

ROBERT SARAZIN, OF CARRIERES SUR SEINE, FRANCE.

METHOD OF ELECTRIC WELDING.

1,302,440.     Specification of Letters Patent.     Patented Apr. 29, 1919.

Application filed January 2, 1919. Serial No. 269,315.

*To all whom it may concern:*

Be it known that I, ROBERT SARAZIN, a citizen of the Republic of France, residing at Carrieres sur Seine, in the county of Seine et Oise and Republic of France, have invented certain new and useful Improvement in Methods of Electric Welding, of which the following is a specification.

My invention consists in an improved method of electric welding. It has for its object to effect a concentration of the lines of electric force between oppositely located electrodes whereby to direct them through intervening elements in the process of welding, whereby to overcome the usual tendency to lateral spreading or wastage of the current.

The invention is particularly adapted to "spot" welding, although it may be utilized in different ways or applications, and it will be understood that the method may be variously amplified or varied in use, depending upon the character of the mechanism employed, the objects being operated upon, and various other conditions or influences contingent upon the particular work in hand.

Ordinarily, in welding together two pieces of metal, as plates or the like, the lines of current through the plates from one electrode to another tend to pass through a greatly enlarged field in the manner of outwardly curved arcs because of the resistance interposed between the electrodes and the resulting bulging or spreading tendency.

I obviate this tendency and effect a substantially direct passage of the lines of force or electric current from the terminal of one electrode to another by combining with the electrodes surrounding magnetic fields which establish around the welding currents a cylindrical embracing series of inclosing magnetic waves which tend to counteract the laterally bulging tendency and to concentrate or centralize the welding current through the plates being operated upon.

In the drawings, which illustrate somewhat diagrammatically the manner of utilizing the invention.

Figure 1 shows a pair of electrodes in operative position with relation to a pair of plates to be welded with the usual current transmission;

Fig. 2 represents similar electrodes inclosed within surrounding magnetic cylinders, with the resulting influence upon the welding currents;

Figure 4:
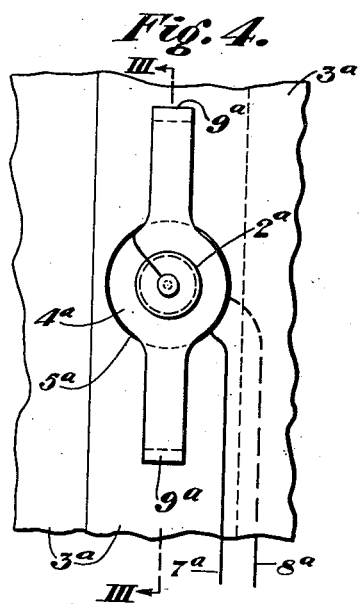
Figs. 3 and 4 are diagrammatic representations showing modified constructions for application of magnetic control to the electrodes at opposite sides.

Referring to Fig. 1, 2—2 represent the oppositely arranged usual electrodes adapted to transmit welding currents through the plates 3—3, represented in dotted lines for the purpose of effecting the "spot" weld connection between them. In such case, the lines of current between the electrodes pass through the plates not only directly between the electrode terminals, as indicated by the direct lines $a$, Fig. 1, but also through an enlarged area of the plates by means of the laterally bulging lines $a'$. The result of such natural deflection of the lines of current is that the heating effect is spread over an unnecessarily increased area with a resulting loss of energy, time and imperfect welding.

In providing means for counteracting such tendency and for localizing the welding currents, I provide for the creation of an annular series of magnetic lines of force $c$ surrounding the lines of current $a$ between the electrodes 2'—2', as in Fig. 2, thereby in effect bundling such current lines within the surrounding lines $c$ of a magnetic field of force generated between surrounding annular cores. The cores 4, of soft iron, are located around the electrodes 2', preferably concentric therewith, and are each provided with an inclosing coil 5. The current from generator 6, either direct or alternating is connected by conductors 7, 8, through coils 5 with each electrode 2' with the resulting effect that the lines of electrode current $a$ are grouped or concentrated within the magnetic current or field $c$. The heating effect of current $a$ is thereby so localized and concentrated with relation to the area of plates 3' to be welded that a great saving in energy and time results.

The tubular cores 4 may also be utilized for pressing the plates 3' together by suitable actuating mechanism in the way of clamps or levers, as will be readily understood, whereby to maintain the desired pressure between the plates during the welding operation. When thus applied, the resulting effect is, as stated, that the main lines of current $a$ between the electrodes are so grouped and the resulting heating effect is so localized with respect to the desired welding area, as to concentrate all of the heating action of the current with the desirable result of effecting welding in the shortest possible time.

The tendency of the current lines to spread around the said area, as indicated in Fig. 1, is thereby obviated because of the counteracting influence of the magnetic currents $c$, the several currents, and especially the currents between the electrodes, being thereby confined in substantial parallelism with the axial center of the electrodes themselves.

Figure 3:
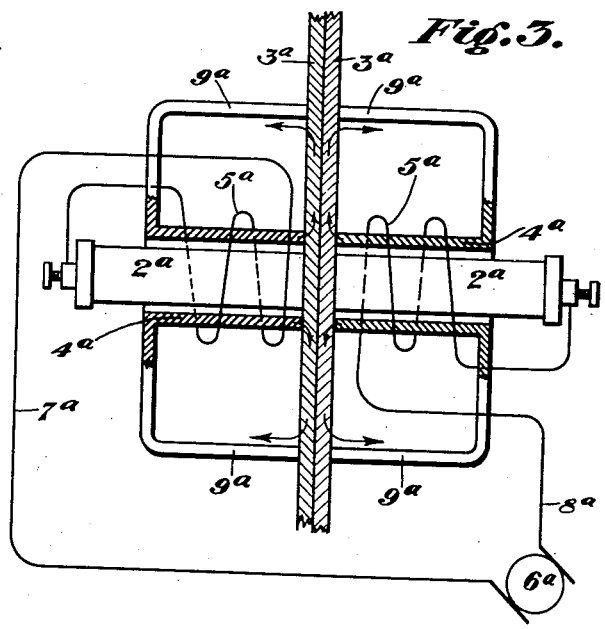

If it is desired, the tubular cores $4^a$ for the surrounding coils $5^a$ may be provided with supplemental bearing arms $9^a$ spaced outwardly beyond the magnetic coil and forming means for concentrating the magnetic lines of force and also diminishing the reluctance of the magnetic circuit, as in Figs. 3 and 4. The transmission of the lines of electric force through the plates $3^a$—$3^a$, from one electrode $2^a$ to the other, and their control is the same as already described, and the use of such frames for the magnets assists in a more even distribution of the forces to bring the plates evenly together.

Figure 6:
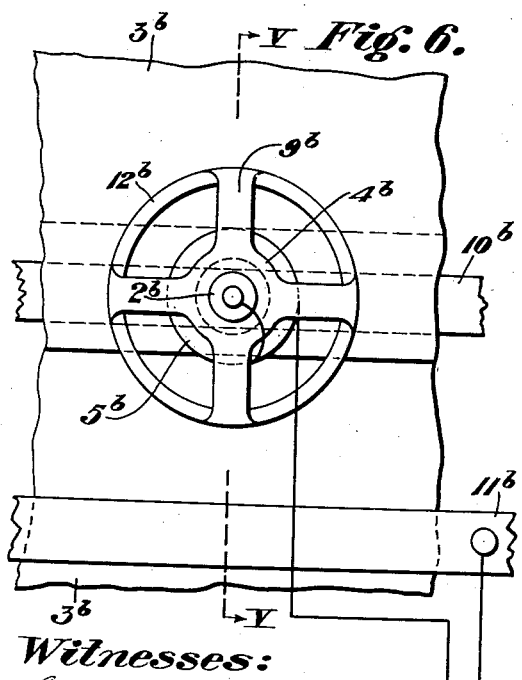
Figs. 5 and 6 are similar views showing the application at one side only in connection with opposing backing pressure.
Figure 5:
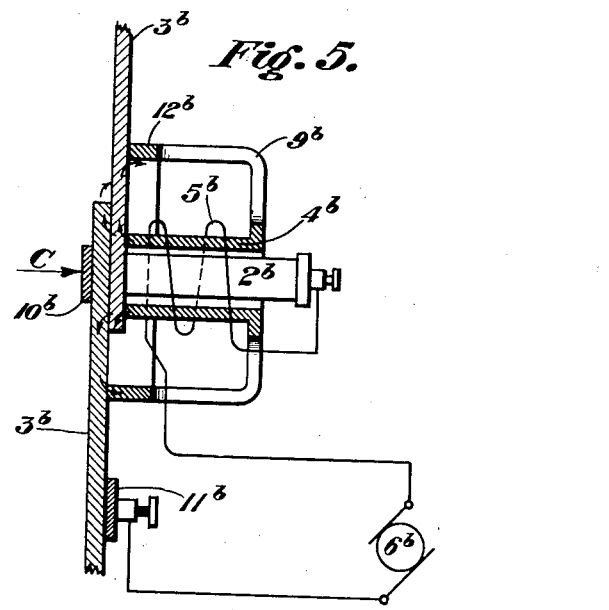

The magnetic fields, instead of having the same direction, would in such case be opposite or in the paths of magnetic lines, as indicated by the arrows.

Where it is desired to use a single solenoid and magnet at one side only of plates or the like for welding, as in ship construction, in connection with a suitable backing pressure, the invention may be utilized in the manner indicated in Figs. 5 and 6. In such case, the lines of current from electrode $2^b$ as controlled by the surrounding magnetic field $5^b$ passes through the plates and to a conductor $10^b$ consisting of a copper bar or the like, the return of the current being through the plate $3^b$ to a similar conductor $11^b$ with which the main circuit wire is connected, as shown. The construction of the magnetic core $4^b$ and its arms $9^b$ which may be connected by a ring $12^b$, is otherwise the same with the flow of the magnetic lines as indicated.

It will also be understood that the electrode $2^b$ is pressed against one of the plates $3^b$ by any suitable means, as is commonly practised in the art, and that a suitable opposing pressure is also exerted against conductor $10^b$ by any convenient backing or resisting force, indicated by the arrow $c$.

It will be understood that the current, either alternating or direct, for the magnetic fields, may be connected in series with the electrode as shown, or that the magnetic excitation may be from a separate source, as preferred. If connected in series, the current will be so heavy that but one or two coils will be sufficient to give the necessary field.

It will be understood that my improved method of electric welding may be utilized through variously different applying or utilizing mechanism as to the shape, design, arrangement, capacity, etc., of the electrodes, and the tubular magnetic cores, their coils, or any other features of construction or application are within the judgment or the design of the electrical engineer or mechanic, but that all such changes are to be considered as within the scope of the following claims.

What I claim is:

1. In the art of electrical welding between oppositely arranged electrodes, the maintenance of the lines of current substantially within the area of direct transmission from one electrode to the other.

2. In the art of electrical welding between oppositely arranged electrodes, the control of the lines of current substantially within the area of direct transmission from one electrode to the other by a surrounding magnetic field.

3. In the art of electrical welding between oppositely arranged electrodes by a current passing between them, the maintenance of a surrounding magnetic field of force.

4. In the art of electrical welding between oppositely arranged electrodes by a current passing between them, the prevention of lateral expansion of said current by surrounding magnetic currents.

In testimony whereof I hereunto affix my signature.

ROBERT SARAZIN.